US005624735A

United States Patent [19]

Anderson et al.

[11] Patent Number: 5,624,735

[45] Date of Patent: *Apr. 29, 1997

[54] POWDER COATING EDGE PRIMER

[75] Inventors: Adam M. Anderson, Shelbyville; Joseph V. Castillo, Marion; Pasquale V. DePalma; Daniel A. Thompson, both of Indianapolis, all of Ind.

[73] Assignee: Cambridge Industries, Inc., Madison Heights, Mich.

[ * ] Notice: The term of this patent shall not extend beyond the expiration date of Pat. No. 5,599,630.

[21] Appl. No.: 465,033

[22] Filed: Jun. 5, 1995

Related U.S. Application Data

[62] Division of Ser. No. 203,119, Feb. 28, 1994, Pat. No. 5,516,551.

[51] Int. Cl.$^6$ .......... B32B 3/02

[52] U.S. Cl. .......... 428/192; 428/193; 428/306.6; 428/317.9; 428/319.3; 428/81; 427/284

[58] Field of Search .......... 428/81, 192, 193, 428/260, 295, 306.6, 317.9, 319.3; 427/284

[56] References Cited

U.S. PATENT DOCUMENTS

| | | | |
|---|---|---|---|
| 3,980,732 | 9/1976 | Isaksen et al. . | |
| 4,987,852 | 1/1991 | Sakai et al. | 118/603 |
| 5,021,297 | 6/1991 | Rhue et al. | 428/430 |
| 5,021,519 | 6/1991 | Varde et al. | 525/423 |
| 5,039,454 | 8/1991 | Policastro et al. | 252/610 |
| 5,043,612 | 8/1991 | Lakin | 310/45 |
| 5,059,446 | 10/1991 | Winkle, Sr. et al. | 427/32 |
| 5,124,176 | 6/1992 | Marrion | 427/195 |
| 5,264,270 | 11/1993 | Agrawal | 428/192 |
| 5,306,537 | 4/1994 | Gustafson et al. | 428/141 |
| 5,338,578 | 8/1994 | Leach | 427/470 |
| 5,344,672 | 9/1994 | Smith | 427/195 |

FOREIGN PATENT DOCUMENTS 51-101043 9/1976 Japan .

OTHER PUBLICATIONS

Encyclopedia of Polymer Science and Engineering, vol. 3, John Wiley & Sons, pp. 632–633.

*Primary Examiner*—Patrick Ryan
*Assistant Examiner*—Marie R. Yamnitzky
*Attorney, Agent, or Firm*—Reising, Ethington, Barnard & Perry

[57] ABSTRACT

Sheet molded compound articles which optionally can be in-mold coated have the edges and exterior margin surfaces thereof sealed with a water-free and solventless fine particle size powder coating. The coating thickness has a gradual and smooth transition from the sealed edge to the non powder coated exterior surface thereby eliminating the need for sanding. The desired method of application is by electrostatic spraying and the cured powder coating is free of pops. Application of the powder coating to the edge and margin portions of the sheet molded compound article includes heating at least the edges of the article near or above the cure temperature of a subsequently applied powder coating to degas the article, reducing the temperature of at least the edge and margin portions of the article to a temperature below the powder coating cure temperature, applying a fine size powder coating material to the edge and margin portion of the article and heating the applied powder coating to a temperature at or above the minimum cure temperature thereof.

8 Claims, 2 Drawing Sheets

POWDER COATING EDGE PRIMER

CROSS-REFERENCE

This application is a division of application Ser. No. 08/203,119, filed on Feb. 28, 1994, of Adam Anderson, Joe Castillo, Pat DePalma and Dan Thompson, for "POWER COATING EDGE PRIMER" (now U.S. Pat. No. 5,516, 551).

FIELD OF INVENTION

The present invention relates to a process for applying a powder coating primer to the edges and adjacent margin portions of a sheet molded compound (SMC) part to seal the same against popping upon cure of either the powder coating or subsequently applied coatings.

The article produced therefrom has a primerless exterior surface except at the edge or margin portions, and therefore the article has no additional surface texture distortion (orange peel, wariness, etc.) typically associated with post molding applied coatings.

BACKGROUND

Heretofore, SMC articles generally containing fiber reinforcement therein have been made by compression molding and optionally in-mold coating the article. Subsequently, the entire exterior surface of the article as well as the edges thereof has been primed or top coated with a liquid coating. However, due to volatiles and/or gases contained within the SMC article, during cure and/or baking of the liquid primer or top coat, the volatiles could migrate to the surface and form a bubble which subsequently could burst (i.e., pop) leaving a crater like abnormality on a desired smooth surface.

SMC articles generally have internal voids. Low profile additives in automotive type body panels may increase the tendency to create internal voids while minimizing the shrinkage of the article's exterior dimensions. Most molded thermoset parts have a resin rich layer on the surface which was in contact with the mold surface. This resin rich layer can partially block passage of gases from the voids to the surface. Any process which disrupts this resin rich layer can expose these internal voids of the article such as die-cutting, deflashing, routing, sanding, punching out holes, and drilling. Solvent treatment and handling of the article during manufacturing and transporting can also cause disruption of the resin rich layer. They can be distinguished easily from molded surfaces.

Surface defects in subsequent coatings caused by the escape of trapped gases are more prevalent on or near machined surfaces than more remote areas of the part. The term machined as used herein does not specifically require that a machine be used to create the surface. These machined surfaces are created after molding and/or in-mold coating has occurred. The voids or pores of the porous plastic can be from a size large enough to be visible to submicron sizes. The voids are believed to supply gases during heated cure cycles that can pass through partially cured coatings creating either holes or craters, i.e., paint pops.

In order to overcome these problems, U.S. Pat. No. 5,021,297 to Rhue et al. relates to a method of preheating the entire substrate at a temperature and mime sufficient to degas the substrate with said temperature being above the cure temperature of the subsequently applied thermoset powder coating composition, immediately applying a thermoset powder coating composition to the entire exterior surface of the heated substrate while not allowing the substrate temperature to drop below the cure temperature of the powder coating composition, and curing the coated substrate at a temperature at or above the minimum cure temperature of the powder coating.

The above mentioned conditions prescribed by the Rhue process create several disadvantages in terms of surface appearance, quality and ease of operation. The application of a powder coating to the entire exterior surface of an SMC article tends to produce a non-smooth "orange peel" appearance, which can be visually unacceptable for many purposes. Perhaps more importantly, the restriction that the substrate temperature be held above the cure temperature of the powder coating during its application requires one or more of the following undesirable conditions:

1) The substrate must be preheated to temperatures substantially above the cure temperature of the powder coating, which can cause structural damage to the SMC article and to any adhesive used therein.

2) A powder coating material with low-temperature curing characteristics must be used, which greatly limits the varieties of powder coating materials which may be suitable.

3) The powder coating application booth must be heated to temperatures near or above the cure temperature of the powder coating, which can cause the powder to melt and plug in hoppers, delivery hoses, application guns, overspray reclamation equipment, etc.

4) The SMC article must be conveyed through the powder coating application booth (from preheat oven to cure oven) at high speed, which requires an excessive amount of powder coating application equipment (powder guns, pumps, hoppers, gun motion machines) in order to adequately coat the SMC article in the time allowed.

5) The length of the powder coating application booth (the distance from the preheat oven to the cure oven) must be minimized which in turn may restrict the recommended application space of one powder application gun to another.

Any or all of the above-defined conditions may be undesirable with regard to process feasibility and/or visual quality of the finished SMC article.

SUMMARY OF THE INVENTION

A powder coating primer is applied at least to the edge and preferably also to margin portions of an SMC article, thereby sealing porosity along the article's edges while not producing a distorted "orange peel" appearance on the exterior surface of the article. The powder coating primer application is performed while the SMC article is at a temperature below or substantially below the minimum cure temperature of the powder coating.

The advantages of present invention often include:

A finished SMC article having a smooth "orange peel" free exterior surface, with porosity along the article edges effectively sealed by the powder coating material;

a large reduction in powder coating material cost since only the edge and margin portions of the SMC article are coated;

a large reduction in expenditure for powder coating application equipment since only the edge and margin portions of the SMC article need be coated, and such application can be performed at lower conveyor speeds;

effective elimination of coating-related defects such as dirt, powder spits, etc., on the non-powder coated exterior surface of the SMC article;

reduced preheat temperatures of the SMC article thereby reducing temperature-related structural damage to the SMC article;

increased cure temperatures of the SMC article, thereby increasing the variety of powder coating materials which can be used for the process, thus allowing improved quality, decreased material costs, etc.;

reduced heating and even ambient temperatures of the powder coating application booth; and reduced speed at which the SMC article is conveyed through the booth whereby less application equipment is required.

BRIEF DESCRIPTION OF DRAWINGS

The following description of the invention will be better understood by reference to the accompanying drawings wherein.

DETAILED DESCRIPTION OF THE INVENTION

An SMC article is typically a compression-molded thermoset polymer or copolymers such as one or more unsaturated polyester resins, epoxy resins, acrylic terminated epoxy resins (also known as vinyl ester resins), phenolics, or melamine formaldehydes. Generally unsaturated polyester and vinyl ester resins are preferred. The SMC articles are often reinforced with various fibers such as polyester, glass (solid or hollow), carbon, nylon, aramid, and the like. The fibers can be present as chopped, non woven webs, woven webs, bundles, strands, etc. Preferred fibers include chopped fiberglass bundles of from about 0.5 to about 1.5 inches (1.3 to 3.8 cm) in length. The articles can contain various additives such as low profile compounds, mold release agents, viscosity modifiers, and mineral fillers such as calcium carbonate, dolomite, clays, talcs, zinc borate, perlite, vermiculite, hollow or solid glass or polymeric microspheres, hydrated alumina, and the like, all as known to the art and to the literature and utilized in conventional amounts. In many articles, an in-mold coating is applied such as various acrylates, polyurethanes, epoxies, and the like.

The present invention applies generally to any SMC article utilized in automobiles, for example, exterior body panels, i.e., hoods, fenders, doors, trunks and lids, or various housings such as mirrors, instrument panels, interior trim panels, and the like; in various appliance housings such as mixers, can openers, blenders; in various computer housings; in various electronic instrument housings; and the like. The present invention does not relate to water-borne and/or to liquid coatings and thus is essentially free thereof, i.e., generally contains less than 5%, desirably less than 3%, and preferably less than 1% by weight or is completely free thereof, based upon the total weight of the powder coating.

The particle size of the powder coating is important to achieve a suitable edge seal and generally is a mean particle size or diameter of from about 10 to about 50 microns, desirably from about 12 to about 35 microns, and preferably from about 15 to about 25 microns. Although larger mean size particles can be utilized, they are not desired inasmuch as they can result in a rough surface (i.e., non-smooth, wavy, etc.) transition between the edge and the nonsealed exterior surface of the SMC article. The powder coating can generally be a polyurethane, an epoxy, an acrylic, or a polyester. Specific examples of suitable commercially available polyester powder coatings include PUA 1177 manufactured by Seibert, 155W277 manufactured by Ferro Corporation, and the like. Acrylic powder coatings include PCC 90111 manufactured by PPG, 158E114 manufactured by Ferro Corporation, ACB 1175 manufactured by Seibert, and the like.

Figure 1:
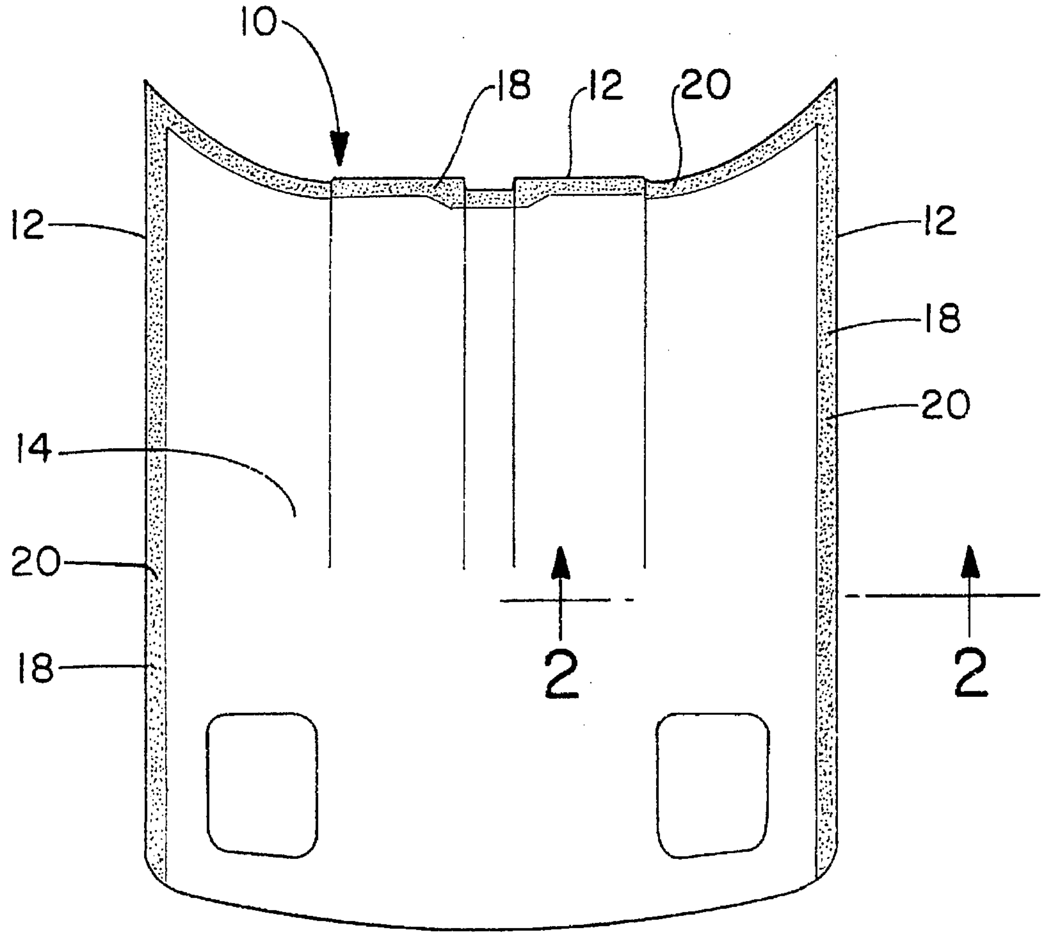
FIG. 1 is a top plan view of an in-mold coated SMC article in the form of an automotive hood showing the powder coating applied to various edges thereof.
Figure 2:
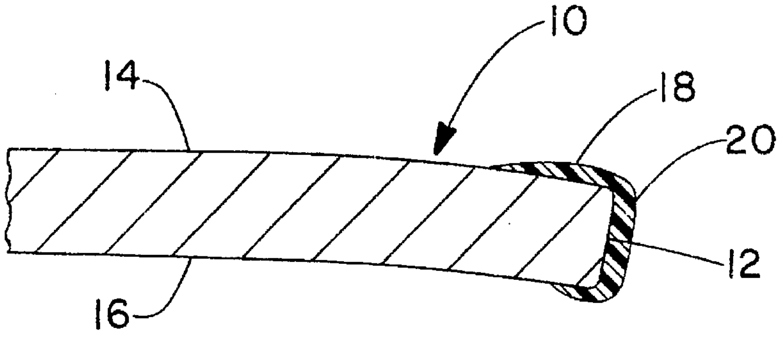
FIG. 2 is a cross-sectional view of a partial portion of the hood taken on line 2—2 of FIG. 1.

Referring now to the drawings, the powder coating is desirably applied only to portions of an SMC article with or without (i.e., free of) in-mold coating which have a porous surface such as edges 12. In FIG. 1, the SMC article 10 is an automobile hood in which various side and back edges 12 have been rounded and are smoothed by machining (e.g., sanding) such that it is free of sharp edges, burrs, flashing, and the like. Edges 12 need not only include the perimeter of the article but can also be the perimeter of various punched-out areas or apertures such as for headlights (not shown), and the like. Once the edges have been prepared, soil, debris, etc., is removed from the article in any conventional manner as by air blow-off or high pressure wash.

Powder coating 20 is then applied to the edges or ends of the article 10 and desirably to a contiguous portion bordering the edges such as margin 18 of exterior (top) surface 14 as well as a margin of the interior (bottom) surface 16. Desirably, the powder coating at the edge of the SMC part has a conventional or suitable thickness such as from about 2 to about 6 or 8 mils and has a gradual taper (decrease) or smooth transition from the article edge extending inward on the exterior surface of the article to a 0 mil thickness. The width of powder border or margin 18 can vary as desired such as from about 0.2 to about 6.0 inches (0.51 to about 15.25 centimeters) from the edge.

The application of the wrap around powder coating to the edge of the article is achieved in any conventional manner such as by spraying and preferably by electrostatically applying the powder coating on the article edges. Generally, the higher the amount of electrostatic charge on the powder coating, the greater the wrap around or margin width of powder coating applied to the end of the exterior portion of the article. The result is an aesthetically acceptable surface finish with respect to the exterior perimeter as well as other edges (e.g., headlight knockout perimeter) of the article with the same being essentially free and generally completely free of any popping whatsoever. An important advantage of the present invention is that no subsequent operations are required with respect to the article such as sanding prior to conventional top coating to provide a smooth margin surface or a gradual transition from the article edge to the inner margin end portion. That is, an unexpected result of the present invention is that when a conventional top coat is subsequently applied to an SMC article which has been powder coating edge primed, the resulting top coat does not exhibit a sandy or dry overspray appearance. Another advantage is that only the edge portions of an SMC article need be powder coated and that the inner or internal surface of the article inward of the margin is substantially and preferably completely free of the powder coating and hence is primerless. Such primerless surfaces are generally smoother or free of distortions such as orange peel, which is associated with coatings or primers applied subsequent to the molding process to the internal SMC surface.

The process of applying the powder coating to the SMC article generally involves heating the entire article, although only the portions thereof to be sealed against porosity such as the edges need be heated. The article is heated to a temperature sufficient to degas the same which is in the neighborhood, i.e., near or above the powder coating cure temperature. The preheating step generally heats the SMC article from about 20° F. (11° C.) below the powder coating cure temperature to about 30° F. (16° C.) or even about 80° F. (44° C.) above the cure temperature with the provision that the SMC article or the in-mold coating thereof is not degraded, deformed, or otherwise damaged. A preferred preheat temperature is generally from about the cure temperature of the subsequently applied powder coating up to about 30° F. (16° C.) or 50° F. (28° C.) above the cure temperature. The heating time can vary and generally is sufficient to degas the article, e.g., from about 10 or 15 minutes to about 30 or 45 minutes. If suitable preheat temperatures and times are not utilized to sufficiently remove volatiles and/or gases from the SMC substrate, imperfections such as popping will occur in the surfaces.

An important advantage of the present invention is that it has been unexpectedly found that if the powder coating is applied to the article the temperature of which is below the cure temperature of the powder coating, no adverse effects occur with regard to surface imperfections such as popping and the like. The reducing or lowering of the SMC article temperature after the preheat step below the powder coating cure temperature greatly facilitates the application of the powder coating inasmuch as the same need not be applied in an oven. Rather, the powder coating can be applied in a partially or completely nonheated enclosure. Accordingly, the SMC article or at least the portions thereof to be sealed against porosity are lowered anywhere from just below, i.e., 1° or 2° F. (1° C.), to about 50° F. (28° C.) or about 90° F. (50° C.) below the powder coating cure temperature and desirably from about 10° F. or 30° F. (5° C. or 17° C.) to about 70° F. or 80° F. (39° C. or 45° C.) below the cure temperature of the powder coating. Should the temperature of the article be above the cure temperature of the coating, there is an increased tendency of the powder particles to melt and coalesce as they travel from the applicator to the SMC substrate. In effect, the powder particles in the spray pattern tend to coalesce into fine strands, often referred to in the art as "cob-webs." As these strands of powder are deposited onto the article surface, they produce an aesthetically unsuitable finish.

The applied powder coating which is applied in a manner and location as noted above, is allowed to reside upon the lowered temperature of the article for a time such that the various particles coalesce and flow to form a smooth surface. Typically, this time is from about a few seconds to a couple of minutes.

After application to the SMC article, the temperature of the powder coating is raised or increased from at least its minimum cure temperature up to about 50° F. (28° C.) above its minimum cure temperature, desirably from about 1° F. (0° C.) to about 25° F. (14° C.), and preferably from about 2° F. (1° C.) to about 15° F. (8° C.) above its minimum cure temperature. The cure time and temperature will naturally vary with regard to the particular type of powder coating, the thickness thereof, the cure rate, and the like. Suitable cure times are generally from about 5 to about 40 and desirably from about 15 to about 30 minutes.

The actual cure temperature of the powder coating is dependant upon the type of powder coating. Polyesters generally have a cure temperature of from about 330° F. (166° C.) to about 380° F. (193° C.) whereas acrylics cure at lower temperatures such as from about 290° F. (143° C.) to about 360° F. (182° C.).

The invention will be better understood by reference to the following examples which serve to illustrate but not to limit the invention.

Figure 3:
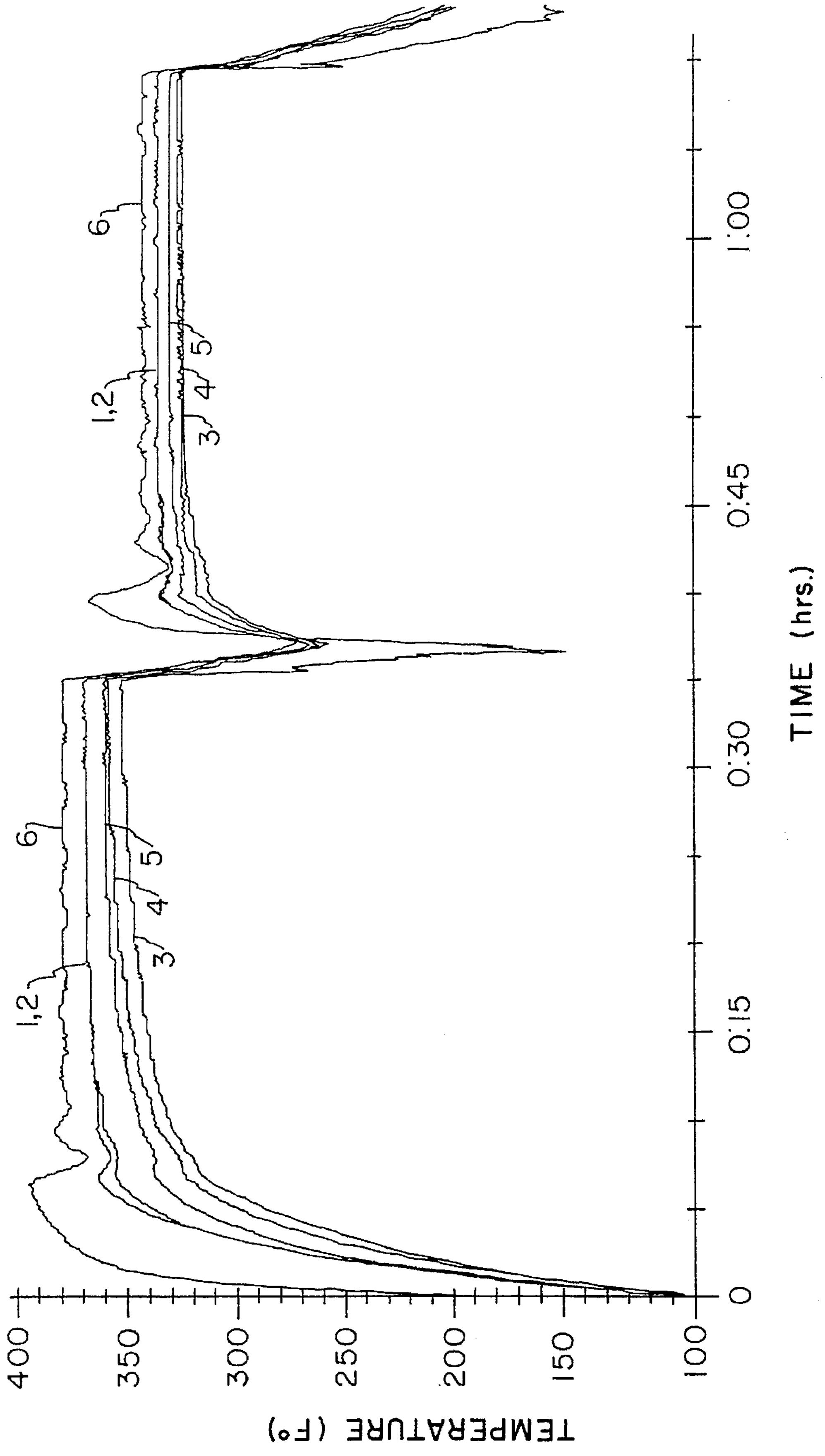
FIG. 3 is a chart showing the temperature of an in-mold coated SMC article at six different probe locations plotted against time for an automotive door which has been powder coated in accordance with the present invention.

A left and right SMC door of a Corvette which was in-mold coated was machined at the edges thereof and at the various perforations thereof such as mirror mount and door handle apertures. Each door had an average of six temperature probes thereon at random locations, e.g., edge, center, etc. The doors were heated for approximately one-half hour at a temperature of 50°–60° F. above the minimum powder coating cure temperature to remove volatiles such as moisture from the pores thereof. Each door was then transferred to a powder coating application booth wherein the temperature of the door dropped generally to about 30° F. to 60° F. below the powder coating cure temperature at which time a Siebert polyester powder primer PUA 1177 was applied to the various edge portions of the door at an electrostatic charge of approximately 50 KV. Approximately 0.5 minutes after the powder coating application, each door was transferred to another oven where upon it was heated to the minimum cure temperature of the powder coating for approximately one-half hour. The exact temperatures and times of one of the doors is set forth in FIG. 3. A total of 69 pairs of doors were powder edge primed in this manner.

The doors were then painted with various colors and a clear topcoat and then baked at a temperature of from about 250° F. (121° C.) to about 275° F. (135° C.).

As controls, Corvette doors were not powder coated (hence not subjected to the edge prime powder coating and heating cycle steps of the present invention) but merely color painted and topcoated in a manner as set forth immediately above.

The number of pops of the controls is compared with the powder coated edges of the present invention wherein only the margins of the machined edges were coated and the same is set forth in Table I.

TABLE I

| | LEFT DOOR | | RIGHT DOOR | |
|---|---|---|---|---|
| COLOR | CONTROL W/O POWDER | WITH POWDER PRIME* | CONTROL W/O POWDER | WITH POWDER PRIME* |
| BLACK | 9.10 | 0.00 | 13.70 | 0.04 |
| POLO GR | 6.00 | — | 8.20 | — |
| TORCH | 3.10 | — | 5.40 | — |
| BRIL RED | 3.67 | 0.00 | 7.56 | 0.20 |
| WHITE | 4.40 | 0.12 | 3.90 | 0.12 |
| BLK ROSE | — | 0.13 | — | 0.13 |
| AQUA | 6.50 | 0.00 | 2.50 | 0.00 |
| AVG/ PART | 5.46 | 0.05 | 6.88 | 0.10 |

As apparent from Table I, the number of pops achieved according to the present invention was essentially nil as compared to an average of 5 to 7 pops in each control.

In addition to essentially eliminating paint pops along the edge portions of an SMC article, the surface of the door when painted and clear coated was aesthetically pleasing, smooth, and free of orange peel and the like.

While in accordance with the Patent Statutes, the best mode and preferred embodiment has been set forth, the scope of the invention is not limited thereto, but rather by the scope of the attached claims.

What is claimed is:

1. In a sheet molded compound (SMC) article having an exterior surface and at least a machined edge having a bordering margin;

the improvement comprising only a machined edge or only said machined edge and said bordering margin being primed with a cured, coalesced powder coating so that the remainder of said SMC exterior surface is primerless with respect to containing a powder coating thereon, any cured, coalesced powder coating primer on said bordering margin having a gradual decrease in thickness from said primed edge to said primerless exterior surface.

2. An SMC article according to claim 1, wherein the cured powder coating primer comprises polyester, polyurethane, acrylic, or an epoxy, or combinations thereof.

3. An SMC article according to claim 2, wherein said primer consists essentially of said polyester, polyurethane, acrylic, or an epoxy, or combinations thereof, and where in the cured, coalesced powder coating primer before coalescing comprises powder particles having a mean particle diameter of from about 10 to about 50 microns.

4. In a sheet molded compound (SMC) article having an exterior surface and at least a machined edge, each machined edge having a bordering margin, the improvement comprising said exterior surface other than said bordering margin being primerless with respect to containing a powder coating thereon and said SMC article having only said at least a machined edge and said bordering margin thereof primed by an applied cured, coalesced powder coating primer.

5. An SMC article according to claim 4, wherein the cured, coalesced powder coating primer before coalescing comprises powder coating particles having a mean particle diameter of from about 10 to about 50 microns.

6. An SMC article according to claim 5, wherein said powder coating primer on said bordering margin has a gradual taper in thickness extending inward from said machined edge, and wherein the powder coating primer comprises polyester, polyurethane, acrylic, or epoxy, or combinations thereof.

7. An SMC article according to claim 6, wherein said mean particle diameter is from about 15 to about 25 microns.

8. An SMC article according to claim 7, wherein said primer consists essentially of said polyester, polyurethane, acrylic, or an epoxy, or combinations thereof.

* * * * *